United States Patent Office 3,099,600
Patented July 30, 1963

3,099,600
CHROMATOGRAPHIC PURIFICATION OF HEPARIN
Nazzareno Toccaceli, Milan, Italy, assignor to Ormonoterapia Richter S.p.A., Milan, Italy, a corporation of Italy
No Drawing. Filed Apr. 17, 1961, Ser. No. 103,206
Claims priority, application Italy Jan. 26, 1961
11 Claims. (Cl. 167—74)

The present invention relates to a novel method for the purification of heparin.

The "pure" heparin products, commonly found on the market, usually have a titer of 100–120 u./mg. Rarely does the titer exceed 130–135 u./mg. In addition to having these low titer values, these products sometimes contain traces of nucleic acids which have been modified by the processes of purification and decolorization. These acids are responsible for the viscosity of concentrated heparin solutions.

The present purification procedure includes a chromatographic treatment of heparin products by an anion exchange material and results in a product which has a higher titer value than previously available heparin products and which is free of impurities such as nucleic acids which are difficult to separate by other methods.

There are many materials suitable for the chromatographic treatment of heparin as heparin is readily adsorbed by any anion exchange resin. However, cellulose anion exchange materials have been found to have much higher adsorption capacities than other anion exchange materials. Cellulosic materials which may be employed are triethylaminoethyl-cellulose (TEAE.-cellulose) and diethylaminoethyl - cellulose (DEAE. - cellulose) with DEAE.-cellulose being preferred because of its very high adsorption capacity (1 gram of DEAE.-cellulose can adsorb up to 235 mg. of heparin) and its availability on the market.

Purification by the present method of heparin having a titer of from 110–120 u./mg. resulted in a final product having a titer of 160–180 u./mg. The less active fraction which was separated had a titer of 25–50 u./mg. The total yield of material having anticoagulant activity varied from 75 to 100% while the yield of the more active fraction varied from 65 to 85%. The variation in yield was dependent upon the starting material.

Two techniques were used:
(a) Column-adsorption and elution
(b) Batch-adsorption and elution.

The first technique usually gave purer products but slightly inferior yields (titer: 160–180 u./mg.—yield: 70–85%); the second gave less pure products but a bit higher yields (titer: 150–160 u./mg.—yield: 75–90%).

The same chromatographic procedure with an anion exchange material may be used for the first purification of crude heparin products. In this case, it is convenient to use the batch technique because of the large quantity of crude material which usually must be purified. The results obtained are as follows:

(a) Titer: 100–130 u./mg
(b) Yield: 75–82%

From these crude products (titer: 45–65 u./mg.), there is additionally obtained a very important fraction of low anticoagulant activity (10–15 u./mg.), which retains, however, a notable clearing activity.

The chromatographic procedure is as follows:
Partially purified or crude heparin is dissolved in a buffered solution (pH of 5.5–8.5), the concentration of the resulting solution being 10–20 mg./ml.

Heparin is adsorbed by anion exchange material buffered at the same pH as the solution of the starting material. The total quantity of anion exchange material may vary from 5 to 12 times the weight of the product to be adsorbed.

After the adsorption is completed, the anion exchange material, which contains all the anticoagulant activity present in the starting material, is washed with adsorption buffer. Then the anion exchange material and adsorbed heparin are eluted with 0.4–0.5 M NaCl solution which removes the less active parts. Next one elutes with 1.0–1.2 M NaCl solution. The eluate is treated with one volume of acetone or with 1.2 vol. of 95% ethyl alcohol and the precipitate obtained is collected by centrifugation, washed with methyl alcohol and then dried under vacuum.

In place of the above-mentioned eluant solutions, there may be used solutions of other salts such as acetates, citrates, tartrates, nitrates, sulfates etc., which elute in a manner completely analogous to sodium chloride. However, NaCl solutions up to 1.2 M or $CH_3COONa$ up to 1.8 M were preferably used. When the salt of a strong acid is used, the first eluant should have an ionic strength of about 0.4 to 0.8 and the eluant used to remove the more active fractions should have an ionic strength of about 0.8 to 1.3. When the salt of a weak acid is used, the first eluant should have an ionic strength of about 0.5 to 0.9 and the eluant used to remove the more active fractions should have an ionic strength of about 0.9 to 1.8.

In the adsorption and elution batch technique, it is preferable to perform two adsorptions, in each of which is used a quantity of resin equal to half of the total (usually for 1 g. of starting material there are used 3–5 g. for the first adsorption and 3–5 g. for the second). Every adsorption lasts 30 min. Immediately afterwards washings are performed for the purpose of removing the inactive mother liquors. Usually two washings with adsorption buffer are required.

The first elution is carried out with three portions of 0.4–0.5 M NaCl solution, stirring for 30 minutes each time and filtering on a Büchner. In this manner, the less active parts of the starting heparin are eliminated.

The second elution is carried out with three portions of 1.0–1.2 M NaCl solution, stirring for 30 min. and filtering on a Büchner. The three eluates are combined and treated with 0.7–1 volume of acetone or with 1.0–1.2 volume of 95% ethyl alcohol.

The active precipitate is hten collected by centrifugation, washed with methyl alcohol and dried under vacuum.

The latter of these procedures is generally used in the purification of crude products. In such a case, the active eluates are somewhat brown-colored and the precipitated product is dark. To eliminate a large part of the colored substances, the precipitate may be redissolved in water, the solution (when necessary) adjusted to a pH of 7.0–9.5 and treated with activated charcoal and filter-aid. The activity losses in this first purification are not high if it is made certain that the pH is in the above-mentioned range. They are, however, very great if the pH is lower. The final decolorization must, nevertheless, always be carried out by one of the classical oxidation methods (with $KMnO_4$, $H_2O_2$, $NaClO$ etc). However, such an operation is not the subject of the present invention.

The following examples describe in more detailed manner the procedures adopted.

Example 1

1 g. of heparin (titer: 110 u./mg.) was dissolved in 100 ml. of 0.1 M acetate buffer solution at pH 6.2 containing NaCl at the concentration of 0.1 M.
Into a column ($\phi$ 24 mm.) were introduced 7 g. of DEAE-cellulose (exchange capacity: 0.95 meq./g.) buffered at pH 6.2 with the acetate buffer used for the heparin solution. The DEAE-cellulose layer was 8.5 cm. high. The heparin solution was percolated through the column, and the DEAE-cellulose and adsorbed material were washed twice with 50 ml. of buffer. The first elution was made with a 0.5 M NaCl solution to eliminate the less active fractions and the traces of nucleic acids; successively was eluted with a 1.2 M NaCl solution. The total eluate was 185 ml. and was precipitated with 1.2 volumes of 95% ethyl alcohol. After remaining for one night at room temperature, the precipitate was collected by centrifugation, washed twice with a small amount of methyl alcohol, and dried under vacuum.

There were obtained 560 mg. of product with a titer of 165 u./mg.; the activity recovery was 83%.

The less active fraction had a titer of 35 u./mg.

Example 2

20 g. of crude heparin (titer: 60 u./mg.) were dissolved in 1 lit. of 0.1 M acetate buffer at pH 6.0 containing 0.1 M NaCl. Two quantities of DEAE-cellulose of 60 g. each were buffered at pH 6 with the buffer used for the heparin solution.

A first adsorption was carried out with the first quantity of buffered DEAE-cellulose, stirring for 30 minutes at room temperature. After filtration on a Büchner, the filtrate was submitted to the second adsorption with the second quantity of buffered DEAE-cellulose, always stirring for 30 min. at room temperature. After filtration, the second quantity of DEAE-cellulose was combined with the first quantity used and two washings with adsorption buffer were carried out (1,200 ml. each time), followed by filtration on a Büchner.

The resin, still containing all the anticoagulant activity present in the starting material, was eluted three times with 1,200 ml. of 0.5 M NaCl solution, stirring for 30 min. at room temperature and filtering each time. The 3 eluates were treated with 1.5 volumes of acetone. The precipitate was collected by centrifugation after standing several hours, washed with methyl alcohol and dried under vacuum. This resulted in a product having a very low anticoagulant activity (9 u./mg.) and a rather considerable clearing activity.

The DEAE-cellulose was eluted three more times with 1,200 ml. of 1.2 M NaCl solution, stirring for 30 min. and filtering each time. The combined eluates were precipitated with one volume of acetone. The precipitate was collected, after standing over-night, by centrifugation, washed with methyl alcohol and dried under vacuum. The product thus obtained was brown in color. It was dissolved in distilled water (300 ml.), adjusted to a pH of 7.8 with 0.1 N NaOH, treated with 20 g. of activated charcoal and 50 g. of Hyflo-Super-Cel and filtered. The filtrate was slightly yellow-brown colored. NaCl was added up to 1% and the product was precipitated with alcohol (1.2 vol.) and collected as mentioned above.

In this manner there was obtained 7.9 g. of heparin with a titer of 125 u./mg. The recovery of anticoagulant activity was approximately 80%.

Example 3

1.5 g. of heparin (titer: 108 u./mg.) were dissolved in 100 ml. of 0.1 M acetate buffer solution at pH 6.1.

Into a column ($\phi$ mm. 30) were introduced 13 g. of DEAE-cellulose (exchange capacity: 0.70 meq./g.) buffered at pH 6.1 with the acetate buffer used for the heparin solution. The DEAE-cellulose layer was 9.5 cm. high. The heparin solution was percolated through the column and immediately afterward, was washed twice with 80 ml. quantities of buffer solution.

The first elution was carried out with 0.7 M sodium acetate buffer at pH 6.1 and the eluate was precipitated with 1.2 vol. of 95% ethyl alcohol. This fraction had a titer of 20 u./mg.

The second elution was carried out with 1.5 M acetate buffer. The eluate was treated with one volume of 95% ethyl alcohol and the precipitate was collected by centrifugation, washed with ethyl alcohol and ether, and dried under vacuum. The product obtained (mg. 703) had a titer of 176 u./mg. The anticoagulant activity recovery was 77%.

I claim:

1. A method of purifying heparin comprising dissolving heparin in a buffered solution having a pH of about 5.5–8.5; adsorbing said heparin solution on an anion exchange material selected from the group consisting of diethylaminoethyl-cellulose and triethylaminoethyl-cellulose; eluting said anion exchange material and adsorbed heparin with a salt solution of relatively low ionic strength to selectively remove the less active fractions of said heparin and eluting said anion exchange material and adsorbed heparin with a second salt solution of relatively high ionic strength to remove the more active fractions of heparin.

2. The method of claim 1 wherein the salt solution of relatively low ionic strength has an ionic strength of from 0.4 to 0.8 and the salt is the salt of a strong acid selected from the group consisting of chlorides, sulfates and nitrates.

3. The method of claim 1 wherein the salt solution of relatively low ionic strength has an ionic strength of from 0.5 to 0.9 and the salt is the salt of a weak acid selected from the group consisting of acetates, tartrates and citrates.

4. The method of claim 1 wherein the salt solution of relatively high ionic strength has an ionic strength of from 0.8 to 1.3 and the salt is the salt of a strong acid selected from the group consisting of chlorides, sulfates and nitrates.

5. The method of claim 1 wherein the salt solution of relatively high ionic strength has an ionic strength of from 0.9 to 1.8 and the salt is the salt of a weak acid selected from the group consisting of acetates, tartrates and citrates.

6. The method of claim 1 wherein the salt solution of relatively low ionic strength is 0.4–0.5 M NaCl solution and the salt solution of relatively high ionic strength is 1.0–1.2 M NaCl solution.

7. The method of claim 1 wherein the fractions of heparin dissolved in the eluates are precipitated by the addition of a member selected from the group consisting of ethyl alcohol and acetone.

8. The process of claim 1 wherein the heparin which is purified is partially purified heparin having a titer of from 100–120 u./mg.

9. The process of claim 1 wherein the heparin which is purified is crude heparin having a titer of from 40–60 u./mg.

10. The process of claim 1 wherein the anion exchange material is diethylaminoethyl-cellulose.

11. The process of claim 10 wherein the anion exchange material is buffered at about the same pH as the heparin solution.

References Cited in the file of this patent

Aew: Chemical Abstracts, vol. 50, 1956, page 16045b.